United States Patent [19]

Moro

[11] Patent Number: 5,177,154
[45] Date of Patent: Jan. 5, 1993

[54] ENVIRONMENTAL COATING SOLUTION

[75] Inventor: Daniel G. Moro, Randolph, N.J.

[73] Assignee: National Patent Development Corp., New York, N.Y.

[21] Appl. No.: 693,833

[22] Filed: Apr. 30, 1991

[51] Int. Cl.$^5$ ............................................. C08F 16/00
[52] U.S. Cl. .................................. 525/328.2; 524/761;
525/329.7; 525/329.9; 525/330.2; 525/330.3;
525/330.5; 525/360
[58] Field of Search ................ 526/318.4, 318.42, 310,
526/312; 524/761; 525/328.2, 329.7, 329.9,
330.2, 330.3, 330.5, 360

[56] References Cited

U.S. PATENT DOCUMENTS

| | | | |
|---|---|---|---|
| 2,827,397 | 3/1958 | Affleck | 526/304 X |
| 3,311,583 | 3/1967 | Bearden | 526/318.42 X |
| 3,970,633 | 7/1976 | Miller et al. | 526/318.42 X |
| 4,066,583 | 1/1978 | Spaulding | 526/318.42 X |
| 4,141,755 | 2/1979 | Weiss et al. | 428/334 X |
| 4,435,539 | 3/1984 | Witiak | 526/318.42 X |
| 4,654,398 | 3/1987 | McFadden | 524/761 X |
| 4,731,982 | 3/1988 | Grant et al. | 526/318.42 X |
| 4,777,230 | 10/1988 | Kamath | 526/318.42 X |

*Primary Examiner*—Joseph L. Schofer
*Assistant Examiner*—J. M. Reddick
*Attorney, Agent, or Firm*—Irene J. Frangos

[57] ABSTRACT

A water compatible terpolymer for sealing and coating building materials which protects surfaces from environmental staining agents. The terpolymer is created by polymerizing a HEMA:SMA co-polymer with another monomer which contains either free acid or base groups. The resultant terpolymer is water solution after neutralization. Water is then added to bring the solvent level to 40% maximum and the solids level to 8%.

7 Claims, No Drawings

ENVIRONMENTAL COATING SOLUTION

This invention relates to an architectural coating solution for application to external building surfaces and to the masonry constructed members so coated.

More particularly, this invention relates to a novel polymer which provides an improvement over the water insoluble, hydrophilic copolymers which are currently available for sealing and coating building materials. The improved coating solutions of this invention comply with current E.P.A constraints on the Volatile Organic Compound level present for architectural industrial coating solutions.

BACKGROUND OF THE INVENTION

The object of the present invention is the protection of building surfaces through the application of hydrophilic polymeric systems to the surfaces of building materials, such as concrete, brick and marble, without changing their appearance. Building surfaces, including painted surfaces, are often porous, difficult to clean and subject to defacement with graffiti. Such surfaces may comprise a wide variety of materials including plaster, masonry, concrete, metal, or wood, and may be coated with typical commercial paints including water-based and oil-based paints such as water-based latexes, water-based enamels, the alkyds, the acrylics, the masonry paints, among others. It is the object of the present invention to provide polymers which can maintain good adhesion to concrete, masonry and paint even when wet, and which can seal or coat such painted or unpainted surfaces to preserve their appearance and integrity, protect them from environmental staining agents and acid rain, and to allow for the removal of graffiti and dirt.

The coating of building materials with hydroxyethyl acrylate monomer and polymerizing the same in place is described in Affleck U.S. Pat. No. 2,827,397. Belgium Pat. No. 780,838 and German Offenlegungsschrift No. P 2211999.9 disclose pre-forming a homopolymer of a hydroxy lower alkyl acrylate or methacrylate or a copolymer thereof with certain copolymerizable monomers, including lower alkyl acrylates and methacrylates, e.g., up to hexyl acrylate.

The problems of lack of extended durability to weathering and to graffiti attacks due to insufficient polymer cure and of obtaining adequate adhesion to the building material were addressed by Jonas Weiss et al. U.S. Pat. No. 4,141,755. Weiss disclosed copolymers of 98–50 percent weight of hydroxy lower alkyl acrylates or methacrylates wherein the alkyl group has 2–3 carbon atoms with 2 to 50 percent weight of stearyl methacrylate or stearyl acrylate. The preferred composition disclosed in the Weiss patent is commercially available under the name of Hydron ®-300. Hydron-300 comprises a copolymer of 90% hydroxyethyl methacrylate ("HEMA") and 10% stearyl methacrylate ("SMA"), cured in situ by the addition of ammonium dichromate, just before application. The stearyl methacrylate provides for better adhesion of the copolymer when wet, especially to limestone, to marble, to glazed ceramic tile and to glazed brick. In addition, dirt removal from surfaces treated with the stearyl methacrylate copolymer is easier than with the coating products available at that time.

Currently, however, because of increasing concerns regarding air pollution and its effects on our environment, the EPA recently instituted regulatory constraints on the Volatile Organic Compound ("V.O.C.") level present in industrial coating solutions. Various states have instituted regulations regarding these levels. For example, New York and New Jersey have implemented regulations prohibiting V.O.C.'s exceeding 45%. The commercially available Hydron ®-300 product contains approximately 92% V.O.C. which greatly exceeds the maximum allowable level of 45%. The present invention relates to a reformulation of a commercially available polymeric coating solution to include a large amount of water, in order to comply with EPA standards. Because the Hydron ®-300 polymer is not water soluble, and only hydrophilic enough to be mixed with small levels of water before precipitating out of solution, the present invention addresses this problem by altering the polymeric composition of Hydron ®-300 in order to render it more water compatible.

SUMMARY OF THE INVENTION

It has now been found that the current Hydron ®-300 polymer (90% HEMA:10% SMA) can be modified by polymerizing these comonomers with another monomer which contains free acid or base groups. The modification involves simple solution polymerization in a solvent, such as ethylene glycol mono methyl ether or propylene glycol mono methyl ether, in the presence of a catalyst, such as azobisisobutyronitrile ("VAZO 64"). The resulting terpolymer, comprising a solids level of about 20%, is then neutralized partially or totally with either acid or base. Water can then be added to the solution without causing precipitation of the polymer. Enough water is added in order to bring the solvent level to 40% maximum and a solids level of about 8%. The resulting terpolymer is not only hydrophilic, like the Hydron ®-300 copolymer, but also water soluble after neutralization.

The amount of acidic or basic ionic monomer required to render the resulting terpolymer water soluble after neutralization varies between 0.5 and 50% of the total monomer weight of the polymerization product. Most preferably, these monomers should represent between 0.5% and 10% by weight. The resultant terpolymer contains between 30 and 98.5% of hydroxyethyl methacrylate ("HEMA"), with 1 to 20% stearyl methacrylate ("SMA") together with 0.5 to 50% of the ionic monomer. The molecular weight distribution for the resulting terpolymer must not be too high, because water tolerance percentage drops dramatically as molecular weight increases. A high molecular weight terpolymer, when formulated with water, would produce a homogeneous water gel product, instead of the desired low viscosity solution. High molecular weight terpolymers could not be applied by spraying, rolling or brushing. This critical molecular weight property is primarily controlled by the % catalyst, polymerization temperature, and % acidic or basic ionic monomer present in the formulation.

The water-diluted and neutralized terpolymer solution is then catalyzed with ammonium dichromate. The resulting solution is then sprayed onto a masonry substrate. Ammonium dichromate crosslinks the polymer upon exposure to light, rendering it insoluble in all solvents, but swellable in polar solvents and water. This dried, cured, water insoluble polymeric coating is similar to the Hydron ®-300 product in performance. The polymers of the present invention produce a film which is more hydrophilic than a Hydron ®-300 film and has an increased water vapor transmission; about 30,000 g/m² day as compared to approximately 25,000 g/m² day. Advantageously, more moisture can escape from the masonry material through the coating, using the polymer of the present invention. In cases where a coating does not allow water to pass through, damage to the building surface could result when the water freezes.

The modified water-compatible product of the present invention compares favorably with the existing commercial products with respect to graffiti protection of the underlying coated surface and the removal of the graffiti from the film without damaging the film or leaving residual ghosting from the paint. Also, dirt is easily removed after the coatings are washed with water containing a detergent. Optionally, a small percentage of anti-foaming/bubbling agent may be added to the terpolymer of the present invention to avoid the entrapment of bubbles in the coating which may be a result of the increased water content of the new product. Another advantage provided by the present invention is that, unlike the existing product for which organic solvents must be used, cleanup is easily achieved with water after spray application.

DETAILED DESCRIPTION

In order that the invention described herein may be more fully understood, the following Examples are set forth. It should be understood that these Examples are for illustrative purposes only, and are not to be construed as limiting this invention in any manner.

EXAMPLE 1

In a 2 liter reaction kettle, 1100 grams of methylcellosolve ether, 262.5 grams HEMA, 7.5 grams methacrylic acid, and 30 grams stearyl methacrylate were mixed and purged with nitrogen for 5 minutes. The temperature of the mixture was raised to 80° C. and 10 ml of a solution containing 4.5 grams of the catalyst VAZO 64 dissolved in 100 grams ethylene glycol mono methyl ether ("methylcellosolve ether") was added under continuous mixing. The catalyst solution was added again every ten minutes until used up and polymerization continued for 4 hours at 80° C. After this solution was cooled down, the polymeric mixture was tested and found to contain 20% solids and a Brookfield viscosity of 70 cps.

EXAMPLE 2

In a 2 liter reaction kettle, 1100 grams of methylcellosolve ether, 262.5 grams HEMA, 7.5 grams methacrylic acid, and 30 grams stearyl methacrylate were mixed and purged with nitrogen for 5 minutes. The temperature of the mixture was raised to 75° C. and 10 ml of a solution containing 1.5 grams Vazo 64 dissolved in 100 grams methocel was added under continuous mixing. The catalyst solution was added again every ten minutes until used up and polymerization continued for 4 hours at 80° C. After this solution was cooled down, the polymeric mixture was tested and found to contain 20% solids and a Brookfield viscosity of 258 cps.

EXAMPLE 3

In a 2 liter reaction kettle, 1100 grams of methylcellosolve ether, 210.0 grams HEMA, 60 grams methacrylic acid, and 30 grams stearyl methacrylate were mixed and purged with nitrogen for 5 minutes. The temperature of the mixture was raised to 75° C. and 10 ml of a solution containing 1.5 grams Vazo 64 dissolved in 100 grams methocel was added under continuous mixing. The catalyst solution was added again every ten minutes until used up and polymerization continued for 4 hours at 75° C. After this solution was cooled down, the polymeric mixture was tested and found to contain 20% solids and a Brookfield viscosity of 429 cps.

EXAMPLE 4

In a 2 liter reaction kettle, 1100 grams of methylcellosolve ether, 262.5 grams HEMA, 7.5 grams dimethylaminoethyl methacrylate, and 30 grams stearyl methacrylate were mixed and purged with nitrogen for 5 minutes. The temperature of the mixture was raised to 80° C. and 10 ml of a solution containing 4.5 grams Vazo 64 dissolved in 100 grams methocel was added under continuous mixing. The catalyst solution was added again every ten minutes until used up and polymerization continued for 4 hours at 80° C. After this solution was cooled down, the polymeric mixture was tested and found to contain 20% solids and a Brookfield viscosity of 88 cps.

EXAMPLE 5

We mixed 250 grams of the solution from Example 1 with 0.50 grams of Uvinol 539. To this solution under rapid mixing, we slowly added 10 ml of 1N NaOH solution and 364 grams of distilled water. Then 0.76 grams of Silane A1111 were added and the solution mixed for an additional hour. To 360 grams of this solution, we added 0.9 grams of BYK-023 defoamer emulsion and 1.2 ml of a 15.5% ammonium dichromate water solution and sprayed the resulting catalyzed solution on a clean glass plate. This coating solution consisted of approximately 8% polymer solids, 32% methocel solvent, and 60% water. As a control, we used the commercially available Hydron ®-300 product (8% solids and 92% solvent mixture of IPA and Methocel). We similarly catalyzed Hydron ®-300 with dichromate and sprayed it on a clean glass plate. Both solutions were also sprayed on several common red brick and cast concrete brick samples. All coated samples were exposed to UV light for 24 hours for curing, and the common red brick and cast concrete brick samples were sprayed with two additional coats of solution and allowed to cure similarly under UV light.

We then subjected the resultant experimental and control products to the following tests:

A. Both glass plates were submerged under methanol for three minutes and then under water for the same length of time in order to determine the film's overall adhesion characteristics. The coated plates were tested by rubbing the surface and assessing whether the film remained adhered to the glass. No apparent differences were detected for both samples, in that both films adhered sufficiently to each respective glass plate.

B. One coated brick and concrete sample for both control and experimental product along with an uncoated brick and concrete sample were exposed to a simulated dirt solution whose composition is defined per American National Standard Institute Test Method Z124.2-1967. All samples were subjected to the dirt solution for 15 minutes, then ultraviolet light for 3 hours to simulate sunlight, then rinsed with water and this cycle repeated an additional nine times. At the end of the experiment, all specimens were washed with a mild detergent using a soft brush and allowed to dry. Upon visual examination of these samples, the surfaces of the uncoated brick and concrete were deeply stained with dirt, and the coated surfaces using the experimental and existing product appeared comparable to each other with respect to cleanliness and significantly cleaner than the uncoated samples.

C. The surfaces of one coated brick and concrete sample for both Hydron ®-300 and experimental product were sprayed using several types of paint to simulate graffiti. As controls, the surfaces of uncoated brick and concrete were also sprayed with paint. All samples were then exposed to direct sunlight for at least twenty-four hours. After this, all specimens were treated with Vandal-X, a commercially available graffiti remover in order to assess whether the paint could be effectively removed from these surfaces. The results indicate that the experimental coating was equally effective in protecting the underlying surfaces from graffiti as the present Hydron ®-300 product. Approximately 95-99% of all the applied paint was removed efficiently with little residual ghosting. The Vandal-X, as expected, did not remove a significant amount of graffiti from the uncoated control surfaces.

EXAMPLE 6

We mixed 250 grams of the solution from Example 1 with 0.5 gram of Uvinol 539. To this solution under rapid mixing, we slowly added 0.5 ml of concentrated $NH_4OH$ solution and 374 grams of distilled water. Then 0.76 gram of Silane A1111 were added and the solution mixed for an additional hour. To 360 grams of this solution, we added 0.9 gram of BYK-023 defoamer emulsion and 1.2 ml of a 15.5% ammonium dichromate water solution. This catalyzed solution was then sprayed on several preweighed pieces of concrete and limestone. All coated samples were exposed to UV light for 24 hours for curing, then two additional coats were applied to all samples and similarly UV cured. The coated samples were reweighed and equilibrated at room temperature at 70% humidity. Uncoated control samples of concrete and limestone were also prepared and weighed.

All control and coated samples were exposed to simulated, accelerated acid rain for extended periods of time using a pump and shower head to create a severe raining situation. This accelerated acid rain was produced by mixing 360 liters of distilled water with 2 liters 1N $H_2SO_4$ and 64 ml of a 74% $HNO_3$ solution. The resulting pH for this accelerated acid rain was approximately 2.2 and would increase to about 5 after exposure to the test specimens which exhibited basic, neutralizing properties. Thus, as the test continued, the acid rain was replaced every eight hours with fresh pH 2.2 material. Periodically, test samples were removed from the study, flushed with excess water and dried at 90° C. for 16 hours. All samples were then equilibrated in a dry desiccator for one hour, subsequently weighed, and put back in the acid rain study.

The results show that the experimental water based coating offers significant protection against the corrosive effects of simulated acid rain. Uncoated concrete samples lost approximately 23% of their weight in about 200 hours of exposure as compared to coated concrete which lost approximately 2% of its weight in the same period of time. Limestone samples eroded at an even faster rate, losing approximately 24% of their weight in about 75 hours as compared to coated samples which lost about 2% of its weight in the same time frame.

While we have hereinbefore presented a number of embodiments of this invention, it is apparent that our basic construction can be altered to provide other embodiments which utilize the compositions of this invention. Therefore, it will be appreciated that the scope of this invention is to be defined by the claims appended hereto rather than by the specific embodiments which have been presented by way of example.

I claim:

1. A water-compatible polymerization product produced by a method comprising the steps of
   (a) polymerizing in a solvent, in the presence of a catalyst, an ionic monomer free acid or base groups with hydroxyethyl methacrylate and stearyl methacrylate to a solids level of approximately 20%
   (b) neutralizing the resultant terpolymer with either acid or base, respectively;
   (c) adding water to decrease the solvent level to 40% maximum and the solids level to 8%, and
   (d) catalyzing with ammonium dichromate to render the polymerization product insoluble upon exposure to light.

2. The product according to claim 1, wherein the solvent is selected from the group consisting of alkylene glycol mono alkyl ethers and other polar solvents.

3. The product according to claim 2, wherein the solvent is selected from the group consisting of ethylene glycol mono methyl ether and propylene glycol mono methyl ether.

4. The product according to claim 1 wherein the catalyst is Azobisisobutyronitrile.

5. The product according to claim 1 wherein the ionic monomer comprises between 0.5 and 50% of the total monomer weight of the polymerization product.

6. The product according to claim 5 wherein the ionic monomer comprises between 0.5 and 10% of the total monomer weight of the polymerization product.

7. The polymerization product according to claim 1 wherein the ionic monomer is selected from the group consisting of methacrylic acid, acrylic acid, dimethylaminoethyl methacrylate and dimethylaminoethyl acrylate.

* * * * *